United States Patent [19]

Fiske

[11] Patent Number: 6,078,468
[45] Date of Patent: Jun. 20, 2000

[54] DATA STORAGE AND/OR RETRIEVAL METHODS AND APPARATUSES AND COMPONENTS THEREOF

[76] Inventor: Orlo James Fiske, 122 Benicia Way, Oxnard, Calif. 93033

[21] Appl. No.: 08/850,401

[22] Filed: May 2, 1997

[51] Int. Cl.[7] .............................. G11B 21/20; G11B 5/58
[52] U.S. Cl. ............................. 360/104; 360/105
[58] Field of Search ............................ 360/97.01, 97.02, 360/75, 103, 104, 105, 106, 109, 128

[56] References Cited

U.S. PATENT DOCUMENTS

| | | | |
|---|---|---|---|
| 3,614,486 | 10/1971 | Smiley | 310/8.2 |
| 4,814,907 | 3/1989 | Goor | 360/103 X |
| 4,841,191 | 6/1989 | Takata et al. | 310/317 |
| 4,843,504 | 6/1989 | Barnes | 360/106 |
| 4,954,904 | 9/1990 | Goor | 360/103 X |
| 4,958,100 | 9/1990 | Crawley et al. | 310/328 |
| 5,068,841 | 11/1991 | Nakayama et al. | 369/13 |
| 5,082,827 | 1/1992 | Barnes | 360/105 X |
| 5,114,913 | 5/1992 | Coufal et al. | 360/103 X |
| 5,142,493 | 8/1992 | Lindmayer | 365/119 |
| 5,195,082 | 3/1993 | Revay et al. | 369/275.2 |
| 5,199,090 | 3/1993 | Bell | 360/114 X |
| 5,202,803 | 4/1993 | Albrecht et al. | 360/97.02 |
| 5,247,493 | 9/1993 | Kime et al. | 369/13 |
| 5,255,260 | 10/1993 | Yamada et al. | 369/199 |
| 5,286,971 | 2/1994 | Betzig et al. | 250/227.26 |
| 5,291,473 | 3/1994 | Pauli | 369/112 |
| 5,296,985 | 3/1994 | Mochizuki et al. | 360/105 |
| 5,325,342 | 6/1994 | Vo-Dinh | 369/13 |
| 5,448,546 | 9/1995 | Pauli | 369/112 |
| 5,466,977 | 11/1995 | Bitterly et al. | 310/74 |
| 5,481,146 | 1/1996 | Davey | 310/90.5 |
| 5,483,511 | 1/1996 | Jewell et al. | 369/44.37 |
| 5,491,680 | 2/1996 | Pauli | 369/112 |
| 5,532,997 | 7/1996 | Pauli | 369/112 |
| 5,541,908 | 7/1996 | Hsu et al. | 369/244 |
| 5,729,408 | 3/1998 | Kikitsu | 360/104 |
| 5,831,795 | 11/1998 | Ma et al. | 360/105 |

FOREIGN PATENT DOCUMENTS

| | | |
|---|---|---|
| 1-066808 | 3/1989 | Japan . |
| 1-130371 | 5/1989 | Japan . |
| 1-151065 | 6/1989 | Japan . |
| 2-226563 | 9/1990 | Japan . |
| 5-020824 | 1/1993 | Japan . |
| 5-135518 | 6/1993 | Japan . |
| 6-243606 | 9/1994 | Japan . |
| 6-243625 | 9/1994 | Japan . |
| 8-186953 | 7/1996 | Japan . |

OTHER PUBLICATIONS

J.R. Reitz, *Forces on Moving Magnets due to Eddy Currents*, Journal of Applied Physics, Apr., 1970, pp. 2067.

H.H.Kolm and R.D.Thornton, *Electromagnetic Flight*, Scientific American, Oct., 1973.

Jewell et al., *Microlasers*, Scientific American, Nov., 1991.

Veldkamp and McHugh, *Binary Optics*, Scientific American, May, 1992.

Betzig et al., *Near–Field Optics: Microscopy, Spectroscopy, and Surface Modification Beyond the Diffraction Limit*, Science, vol. 257, Jul., 1992.

*Primary Examiner*—William J. Klimowicz
*Attorney, Agent, or Firm*—Gregory A. Piccionelli; Anna M. Vradenburgh

[57] ABSTRACT

A disk drive system and method employs sheet lift effect to suspend a data storage disk during high speed rotation. The system includes a data storage disk composed, at least partially, of an electrically conductive, nonmagnetic material and having at least one disk surface through which data communication may occur. The disk is rotated within an air-evacuated housing adjacent at least one magnet member. The interaction of the magnet member and the conductive, nonmagnetic material on the disk provides a sheet lift force suitable to suspend the disk during high speed rotation, such that the disk makes no physical contact with the housing or any structure fixed relative the housing. A read/write head assembly may also be provided with at least one magnet member which interacts with the conductive, nonmagnetic material on the disk to support the head assembly in a spaced relation to the disk surface.

26 Claims, 12 Drawing Sheets

DATA STORAGE AND/OR RETRIEVAL METHODS AND APPARATUSES AND COMPONENTS THEREOF

FIELD OF THE INVENTION

The present invention relates, generally, to data storage and/or retrieval methods and apparatuses and components thereof and, in preferred embodiments, to disk drive systems for optical or electromagnetic recording disks.

BACKGROUND OF THE INVENTION

Since the advent of electronic computers several decades ago and the subsequent improvements in computation speed and efficiency, there has been an increasing need for a practical means to rapidly store and retrieve large volumes of digital data. Many types of mass storage devices have been developed, and after much trial and error what is commonly referred to as the rigid disk drive or "hard drive" has become widely accepted. Nearly every computer presently sold is accompanied by one or more hard drives. Explosive growth in the use of digital communications and multimedia has driven the demand for data storage even higher, while at the same time the acceptable data access latency has shrunk dramatically—computers have no moving parts, and continue to double in speed about every eighteen months. Unfortunately, conventional disk drives are limited by mechanical considerations and thus have a difficult time keeping up with the developments.

In many of the most demanding applications, industry has resigned itself to the considerable expense of Redundant Arrays of Inexpensive Disks, referred to as RAID, often augmented by a large bank of fast-access semiconductor cache RAM, to increase storage capacity, reliability, data transfer rate and access speed. However, increasing the number of disk drives does not decrease the worst-case data access time; a semiconductor cache memory only speeds access to the small fraction of data stored in the memory; and using disk arrays can more than double the cost per unit of data storage. In other applications the need for greater storage capacity and higher performance is also accompanied by the need for high durability and shock resistance, plus minimum size, power consumption, and of course, cost.

An example of a typical hard drive apparatus 10 is represented in FIGS. 1A and 1B. In general, the illustrated configuration includes a motor driven spindle 12 for supporting disks 14 and 15 for rotational motion about the spindle axis. For each disk surface, the apparatus also includes a read and/or write head 13 supported on a head slider 16, which is supported by a load beam 18 and a high speed actuator 20. The actuator 20 is controlled to selectively move the head slider 16 radially across the disk surface, to locate the head adjacent selective data tracks on the disk. The illustrated apparatus also includes read/write and actuator control electronics 22 and voice coil motor means 23, for controlling the operation of each actuator 20 and head 13.

As shown in the side, cutaway view of FIG. 1B, the two disks 14 and 15 are mounted on a single spindle 12 with one slider devoted to each disk surface. Actual drives have employed more or less than two disks. The spindle 12 is rotatably driven, through a conventional high speed bearing 17, by a motor 19.

As shown in the enlarged view in FIG. 1C, each slider 16 is suspended by a flexure 24 from the end of a load beam 18. The mass of the load beam 18 forces the slider 16 and head 13 toward the surface 26 of the disk. As the disk moves (in the direction represented by arrow 28) a film of rapidly moving air 30 is produced by disk motion. The rapidly moving air 30 along the disk surface creates an "air bearing" effect, which inhibits the slider 16 from making physical contact with the disk surface 26, thus minimizing wear.

The head/disk separation distance, also known as slider "flying height", is a critical parameter—decreasing it improves signal strength and, thus, allows higher data recording densities, but decreasing it too much can prompt a head "crash" in which the head impacts the disk surface, damaging or destroying one or both of them. Flying height has been steadily decreased over the years until disk drives are now designed with flying heights of 100 nanometers or less. Efforts are underway to decrease flying height even further, and various methods have also been proposed (see below) to minimize flying height variation caused by differences in disk surface speed relative to the head over the range of head travel.

High performance drives currently available, with disks 90 mm (3.5") in diameter, have a worse-case seek time (the time required to move the read/write head from the data track at one end of its range to the track at the other end) of nearly 20 milliseconds. In addition, they have a maximum rotational delay of 6 milliseconds (spinning at 10,000 RPM's). Thus the time required simply to begin a data transfer can be almost 26 milliseconds—a relatively long period of time for computers, especially those which handle data requests from thousands of simultaneous network users. Note that these times are for some of the highest performance disk drives. More typical drives are significantly slower. Improvements have been made in disk rotation rates, but increases in rpms promote an increase in shaft bearing friction, an increase in friction between disk surfaces and air in the disk chamber, increased power consumption by the disk motor to overcome this friction, increased heat production, and reduced longevity.

SUMMARY OF THE DISCLOSURE

Preferred embodiments of data storage/retrieval methods and apparatuses described herein comprise rigid disk drive systems with greatly improved data access speed, data storage density, reliability, and power consumption. Passive magnetic levitation (or sheet lift) is used to suspend data storage disks and read/write heads such that no physical contact between moving components is allowed during normal operation. The disks are constructed of high strength, low density material and spun in an evacuated chamber at up to 100,000 rpms or more, substantially reducing rotational delay. The disks are composed, at least partially, of an electrically conductive, nonmagnetic material and having at least one disk surface through which data communication may occur.

The disks are rotated within an air-evacuated housing adjacent at least one magnet member. The interaction of the magnet member and the conductive, nonmagnetic material on the disk provides a sheet lift force suitable to suspend the disk during high speed rotation, such that the disk makes no physical contact with the housing or any structure fixed relative to the housing. A read/write head assembly may also be provided with at least one magnet member which interacts with the conductive, nonmagnetic material on the disk to support the head assembly in a spaced relation to the disk surface.

In preferred embodiments, single channel read/write heads are replaced by linear head arrays, reducing required head movement from the usual range of several centimeters to a fraction of a millimeter. Also in preferred embodiments, head movement is accomplished by a piezoelectric actuator, improving worst-case seek time by up to a factor of 100 or more compared to conventional systems. Preferred embodiments utilize optical heads, while other preferred embodiments employ magnetic recording heads. Further preferred embodiments employ nearfield optical techniques, which can allow massive increases in data storage capacity. These improvements are accompanied by a substantial reduction in mechanical complexity and the potential for reduced cost compared to conventional designs.

BRIEF DESCRIPTION OF THE DRAWINGS

A detailed description of preferred embodiments of the invention will be made with reference to the accompanying drawings, wherein like numerals designate corresponding parts in the several figures.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

The present invention relates, generally, to data storage and retrieval methods and apparatuses and components thereof and, in preferred embodiments, to disk drive systems for optical or electromagnetic recording disks, wherein sheet lift is employed to support a rotating disk and to support a read and/or write head adjacent the disk surface.

Figure 2A:
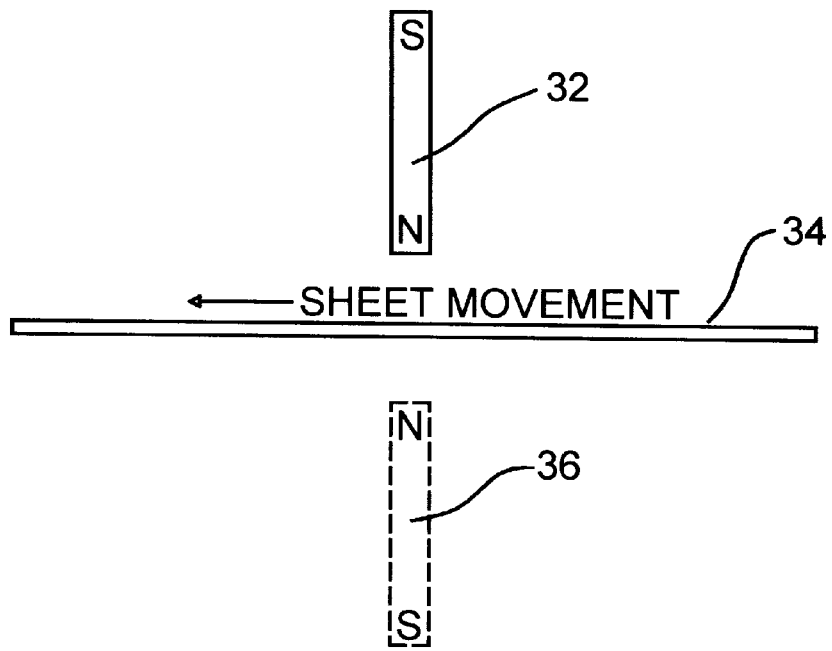
FIG. 2A is a schematic representation showing an "image" magnet effect of a magnet placed near a rapidly moving, nonmagnetic, conductive sheet.
Figure 2B:
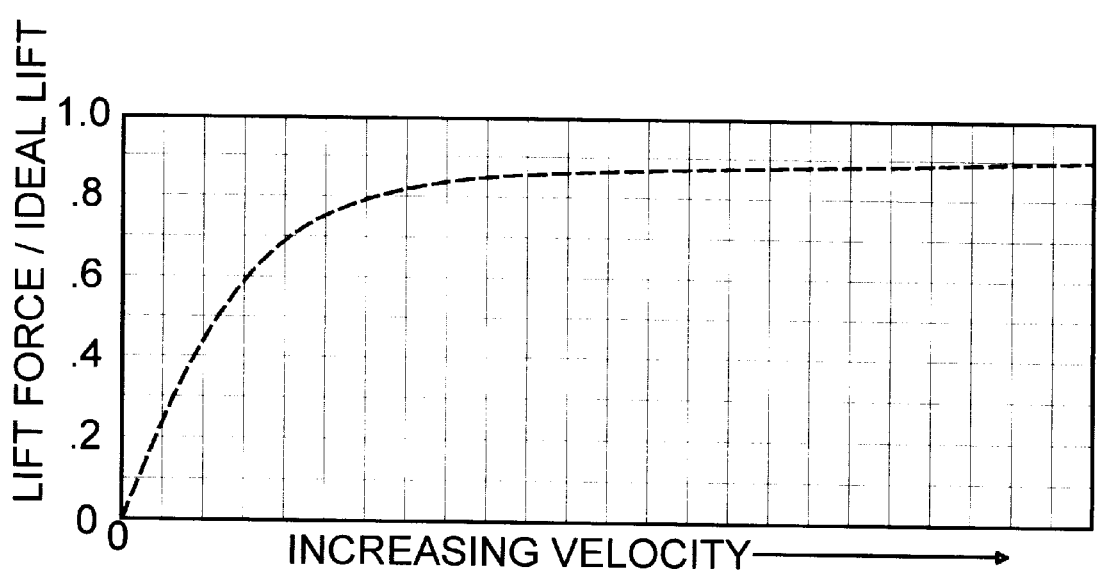
FIG. 2B is a graph representing sheet velocity versus lift force experienced by the magnet shown in FIG. 2A.

If a magnet or current-carrying coil is placed near a moving sheet of conductive, nonmagnetic material, such as aluminum or copper, it will experience a repulsive force sometimes called "sheet lift" (J. R. Reitz, *Forces on Moving Magnets due to Eddy Currents,* Journal of Applied Physics, April, 1970, pp. 2067). With reference to FIG. 2A, as the relative velocity between a magnet 32 and a sheet 34 increases, the repulsion force increases until it approximates the force that would be caused by an identical magnet, referred to as an "image" magnet 36 (shown in broken lines), placed an equal distance on the opposite side of the sheet. The rapid increase in lift force is illustrated by the graph in FIG. 2B. As an example of this phenomenon, superconducting magnets accelerated to high speed are easily capable of levitating an entire train several inches above a passive aluminum track (H. H. Kolm and R. D. Thornton, *Electromagnetic Flight*, Scientific American, October, 1973). Moreover, as explained in detail by Reitz, sheet lift increases dramatically as the magnet is forced closer to the conductive sheet. This provides a means to create stable levitation with a simple, conductive surface and one magnet, without the need for a complex and expensive feedback control system. By properly selecting magnet strength or adjusting current passing through a coil a specific levitation distance or "flying height" can be achieved.

Figure 3A:
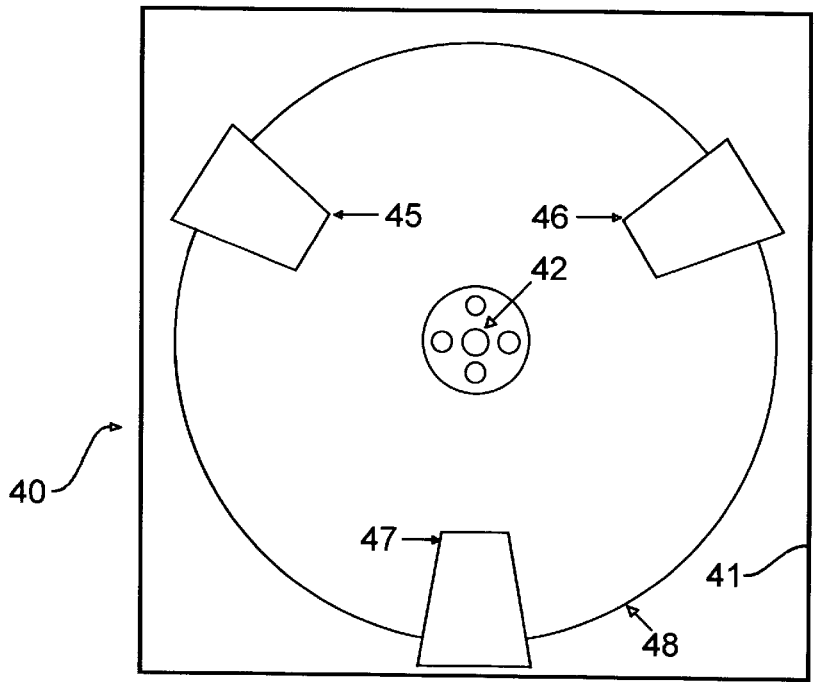
FIG. 3A is a top view of a disk drive apparatus employing an arrangement of magnetic bearings according to a first embodiment of the present invention.
Figure 3B:
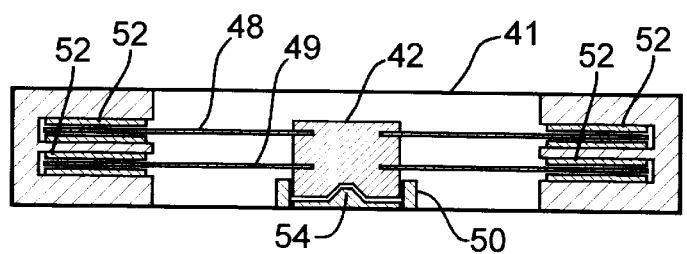
FIG. 3B is a side cross-sectional view of the disk drive apparatus of FIG. 3A.

FIGS. 3A and 3B depict an optical disk drive apparatus 40 (without the head) designed to generate and employ sheet lift, according to a first embodiment of the present invention. The disk drive apparatus 40 includes a housing 41 containing a spindle 42 and a number of magnetic bearings for supporting at least one disk for rotational movement about the spindle axis. In the illustrated embodiment, two disks 48 and 49 are supported by the spindle 42 in a disk-receiving area of the housing 41. However, it will be understood that further embodiments may be readily designed to operate with any suitable number of disks. Also, in the illustrated embodiment, three equally spaced magnetic bearings 45, 46 and 47 are employed. However, it will be understood that further embodiments may include more or less magnetic bearings in any suitable arrangement to effect the desired sheet lift.

In the illustrated embodiment, the disks are of conventional aluminum construction, coated with phase-change layers or electron trapping optical memory, for example. When spun up to speed the disks are supported and suspended at three points by sheet lift resulting from the interaction of levitation magnets and the aluminum disk material, creating a magnetic bearing effect. A motor 50, preferably a DC synchronous motor or any other type capable of high speed operation and not requiring physical contact to be maintained with the rotor, operates to rotate the rotor (and disks). In the illustrated embodiment, the rotor of the motor 50 is a unitary part of the spindle. Thus no moving parts are required to contact any other parts, moving or stationary, during normal, high speed operation.

As best shown in FIG. 3B, stabilization magnets 52 are preferably located on the opposite side of each disk from the levitation magnets. The stabilization magnets 52 provide a downward directed force (relative to the direction of orientation shown in the Figs.), to prevent the disk assembly from rising due to shock or vibration. When stationary or rotating at slow speed the disk assembly is supported by a touch-down bearing 54.

According to preferred embodiments, the disk drive apparatus as shown in FIGS. 3A and 3B includes an optical system and head actuator assembly (not shown) of conventional design. However, instead of an air-bearing slider of the type shown in FIG. 1C, preferred embodiments include a magnetic levitation (maglev) slider 56 supported by an actuator arm 55, such as shown in FIG. 3C.

Figure 3C:
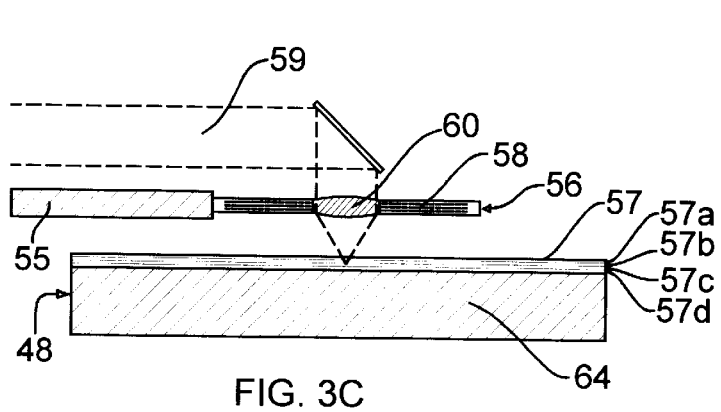
FIG. 3C is an enlarged side view of a maglev head arrangement used with the apparatus of FIGS. 3A and 3B.
Figure 3D:
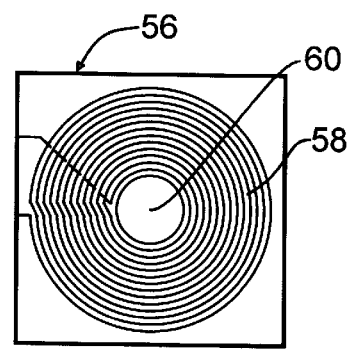
FIG. 3D is a top view of the maglev coil used in the head shown in FIG. 3C.

FIG. 3C shows a side view of a preferred embodiment of a maglev slider 56 in operation, flying close to the optical disk surface 57. FIG. 3D depicts the underside (as viewed from the disk surface 57) of the slider 56 with a levitation coil 58 surrounding an optical focusing lens 60. Since the disk spins with constant angular velocity, the linear velocity of the disk surface relative to the head can vary by more than a factor of two as the head moves from the inside diameter (I.D.) track to the outside diameter (O.D.) track. But as shown by the graph in FIG. 2B, above a certain minimum velocity the lift force is nearly constant. Thus, as long as the head/surface velocity is above the minimum at the I.D., head flying height will remain nearly constant all the way out to the O.D.

Flying height can be varied, however, by altering the electric current passing through the maglev coil 58. Thus, by appropriately controlling the coil current, the focus point of the lens may be controlled. This provides a simple mechanism for changing the focus of the read beam 59, allowing its use in read-only optical disk systems (CD-ROM) with multiple, partially transparent layers of recorded information stacked one upon the other. In the configuration shown in FIG. 3C, four data storage layers 57a, 57b, 57c and 57d are disposed on a disk core 64. However, it will be understood that, in further embodiments, more or less than four data storage layers may be used.

At low disk rotation speeds, the disk assembly (disks and spindle) is supported for rotation on the touch-down bearing, as discussed above. Preferably, at such low disk speeds, the actuator arm (or other support structure, such as a support arm as described below with respect to FIGS. 4E and 4F) supports the head assembly in a spaced relation from the disk surface. As the disk moves toward its levitated position (i.e., as disk speeds increase), the spacing between the disk surface and the head assembly will be maintained by the sheet lift effect created between the rotating disk surface and the magnet or coil on the head assembly.

Figure 1A:
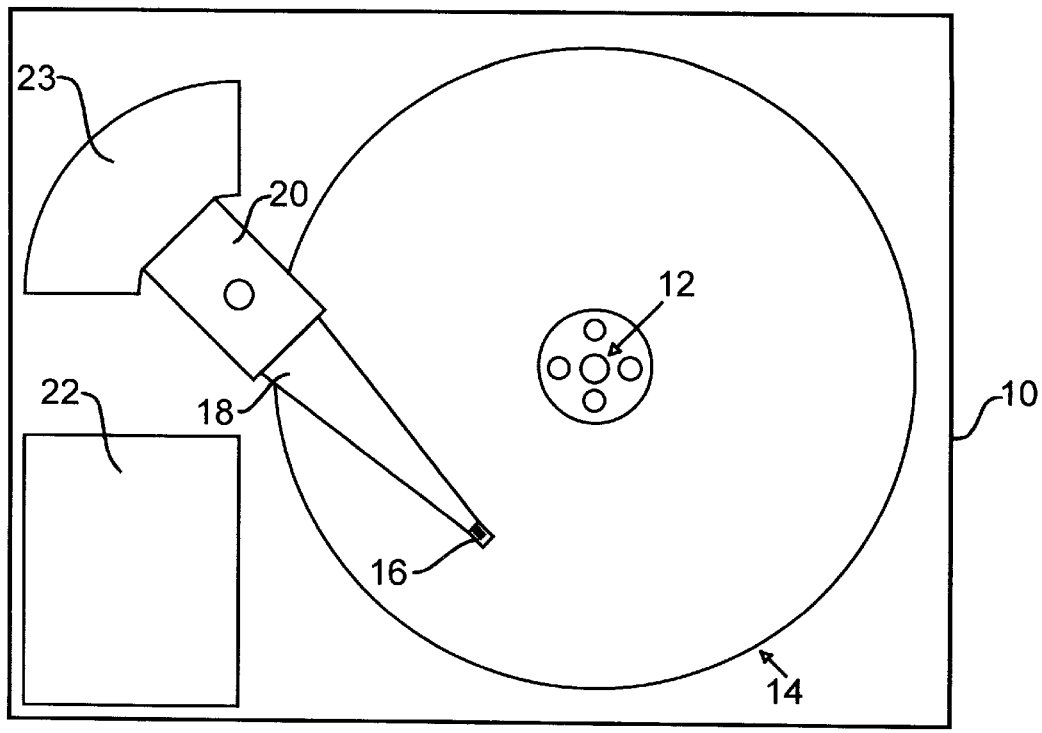
FIG. 1A is a top view of a typical hard disk drive using magnetic recording.
Figure 1B:
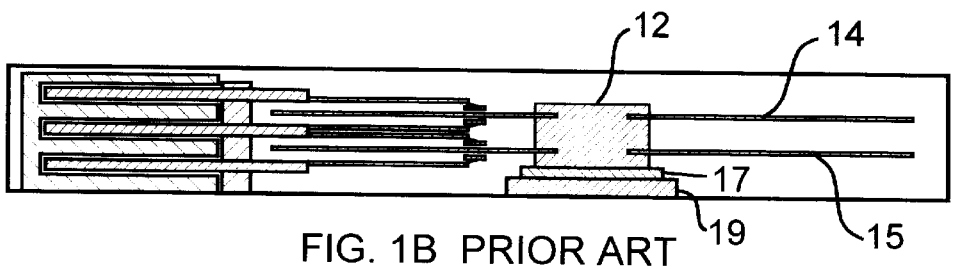
FIG. 1B is a side cross-sectional view of the disk drive shown in FIG. 1A.
Figure 1C:
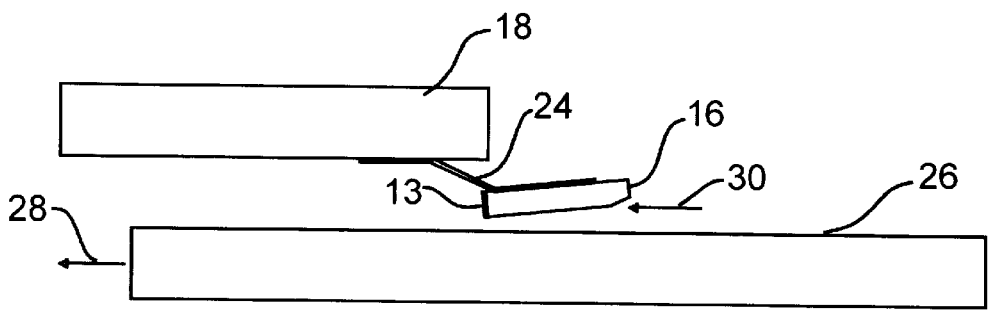
FIG. 1C is an enlarged side view of a magnetic head slider with air bearing as used in the disk drive shown in FIGS. 1A and 1B.

The apparatus shown with respect to FIGS. 3A–3D can be simple, inexpensive, and reliable, and has the added advantage of not needing air for head support. The disk and magnetic bearing structure is preferably disposed in a sealed, air-evacuated housing 41, so as to substantially eliminate air friction during rotation of the disk. Unlike air friction, the drag that accompanies sheet lift actually decreases as magnet/sheet velocity increases. Even at high rpms, drag is minimal and drive motor power consumption can be far lower than that required by typical conventional rigid disk drive apparatuses as shown in FIGS. 1A–1C. In yet further embodiments, the housing may contain a suitable heat-conductive gas, for conducting heat from the disk (or other system components within the housing) to, for example, the housing walls. In such further embodiments, the housing walls may be cooled by external cooling means (not shown) and/or may be provided with cooling fins or the like.

Without the limits normally imposed by bearing constraints or friction-induced power consumption, disk rotation speed is mechanically limited primarily by the ratio of tensile strength to density of the disk material itself (see, e.g., U.S. Pat. No. 5,466,977 to Bitterly et al.). Fabricating the disk core 64 of such high strength, low density materials as fiberglass, graphite, Kevlar, or fused silica can increase the maximum rotation speed to over 200,000 RPM's. Another preferred core material is single crystal silicon, for example, of the type used in the manufacture of integrated circuits. Although typically not capable of providing the tensile strength for rotation speeds as high as some of the other materials, silicon is readily available in disks of suitable dimensions for use in data storage drives, is routinely polished to extreme flatness as is desired for high density data storage, and is relatively inexpensive. In preferred embodiments, an aluminum, copper, or other conductive, nonmagnetic coating is deposited on the high strength core 64 to produce the magnetic mirror effect, and this in turn is coated with at least one optical recording layer (and, preferably, multiple recording layers) and an abrasion-resistant protection layer such as diamond-like carbon (DLC).

Figure 4A:
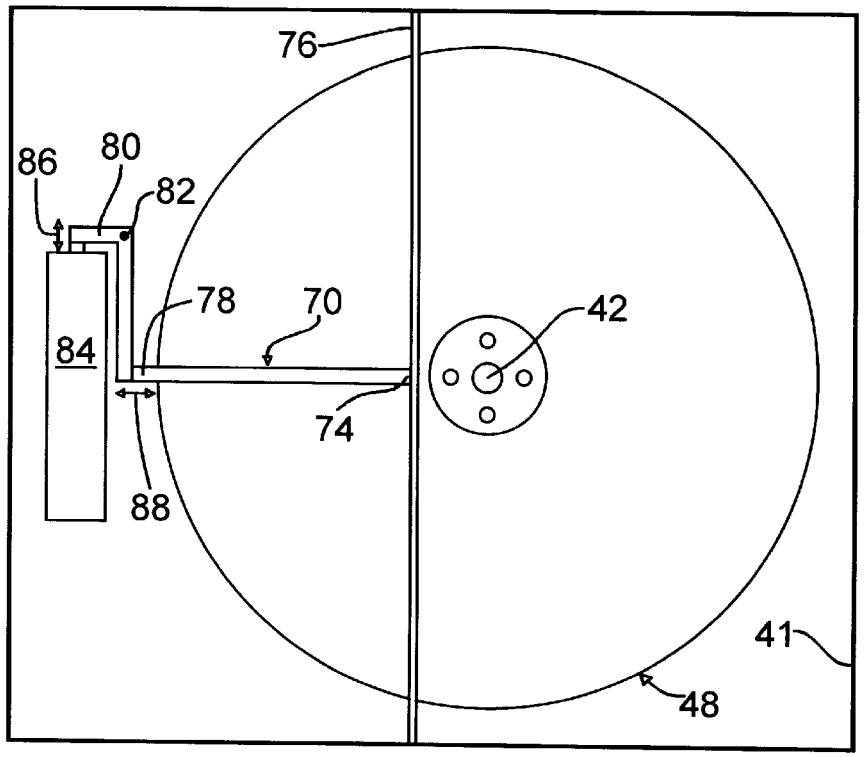
FIG. 4A is a top view of an optical disk drive apparatus according to a second embodiment of an optical disk drive.
Figure 4B:
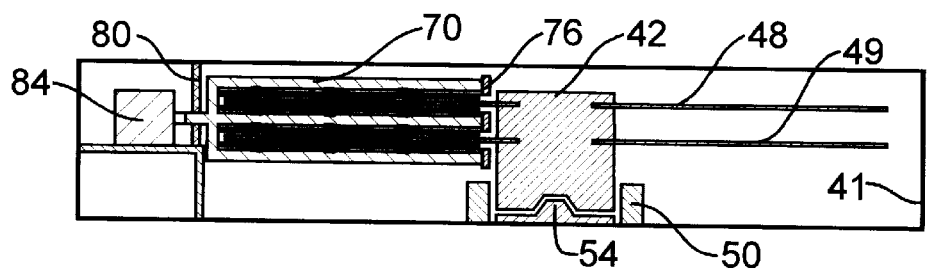
FIG. 4B is a side cross-sectional view of the drive shown of FIG. 4A.
Figure 4C:
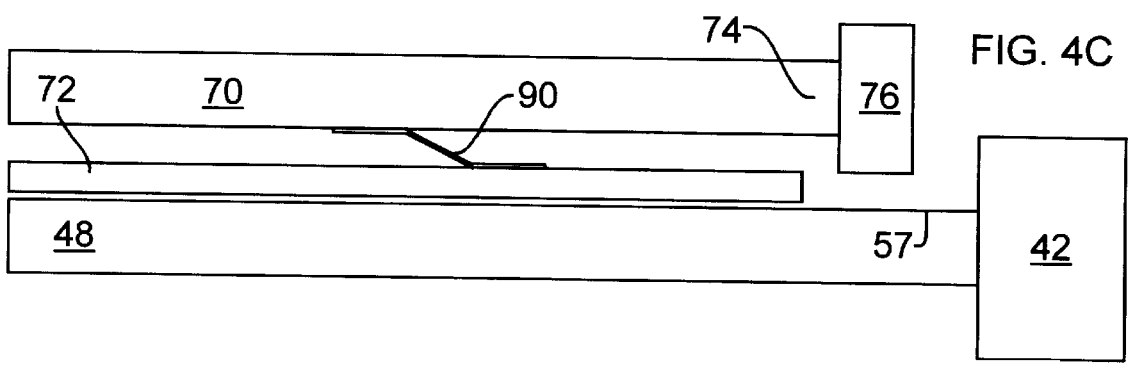
FIG. 4C is an enlarged side view of one end of a head array support arm and head assembly from the disk drive used with the apparatus of FIGS. 4A and 4B.

An optical disk drive apparatus according to a second embodiment of the present invention is shown in FIGS. 4A–4C. In preferred embodiments, a magnetic bearing assembly as shown and described above with respect to FIGS. 3A and 3B, is used to support the disk during high speed rotation. However, further embodiments may employ other suitable disk supporting and driving means, including conventional support bearing and drive motor structures. For purposes of simplifying the present disclosure, the embodiment illustrated in FIGS. 4A and 4B are shown with two disks 48 and 49 on a spindle 42, which is driven by a motor 50 as described above with respect to FIGS. 3A and 3B.

The apparatus in FIGS. 4A–4C, however, further includes a head assembly which can greatly reduce seek time (the time required to move the read and/or write head to a position adjacent the appropriate data track on the disk). The illustrated head assembly includes a head array support arm 70 for supporting a head array 72. The support arm 70 is coupled at one end 74 to a flexible cross brace 76 and at the opposite end 78 to a pivotal lever member 80. The pivotal lever 80 is mounted for pivotal motion about a pivot point 82 by selective actuation of an actuator 84. Selective energizing of the actuator 84 causes selective actuator motion in the direction of double arrow 86, which is transferred through the pivotal lever 80 to selective movement of the head array support arm 70 in the direction of double arrow 88. In this manner, the head array 72 (FIG. 4C) supported by the head array support arm 70 may be selectively moved relative to the disk surface 57, generally in the radial direction of the disk.

In preferred embodiments, the actuator 84 is a piezoelectric actuator, constructed of a piezoceramic material that expands or contracts almost instantaneously in response to an applied voltage, thus providing a short movement stroke but with high force and very high speed. Stroke length may be increased using mechanical amplification techniques, such as the pivoting lever arrangement shown in FIG. 4A or other suitable amplification structure. Alternatively, the actuator 84 may be directly connected to head array support arm 70. Preferably, the piezoelectric actuator 84 is configured as a piezoelectric "stack." Piezoelectric stack configurations and control technology is described, for example, in U.S. Pat. No. 4,841,191 to Takata et al. (for use in a "superfine positioning apparatus") and in U.S. Pat. No. 3,614,486 to Smiley (for "high-speed printer hammers and the like"), each of which are incorporated herein by reference. However, other well known piezoelectric (or piezoceramic) configurations including, but not limited to, bimorph-type disk, beam, or cantilever designs may be used in further embodiments. Also, in yet further embodiments, actuators other than piezoelectric (such as, but not limited to, electromagnetic solenoid actuators, electrostrictive devices, electrostatic devices, piezoceramic devices or the like) may be used as actuator 84. However, piezoelectric (and more preferably, piezoelectric stack) actuators are preferred due to their reliability, actuation speed and accuracy.

As discussed above, the head array support arm 70 is coupled to the actuator 84 (through the pivotal lever 80) at one end 78, and a flexing cross brace 76 at the other end 74 of the arm. The support arm 70 is preferably made of a material having sufficient strength and rigidity for supporting the head assembly adjacent the disk surface, including, but not limited to, metals such as aluminum, plastics, composite materials or the like. The flexing cross brace 76 is made of a material that provides sufficient strength and rigidity for supporting one end of the support arm and sufficient spring-action restoring force to assist the actuator 84 in returning the head support arm 70 to its starting position after a read or write excursion. Suitable materials for the cross brace 76 include, but are not limited to rigid metals such as spring metals, plastics, composite materials, or the like.

At low disk rotation speeds, the disk assembly (disks and spindle) is supported for rotation on the touch-down bearing, as discussed above. Preferably, at such low disk speeds, the head array support arm 70 supports the head array 72 in a spaced relation from the disk surface. As the disk moves toward its levitated position (i.e., as disk speeds increase), the spacing between the disk surface and the head assembly will be maintained by the sheet lift effect created between the rotating disk surface and the magnet or coil on the head assembly.

Figure 4D:
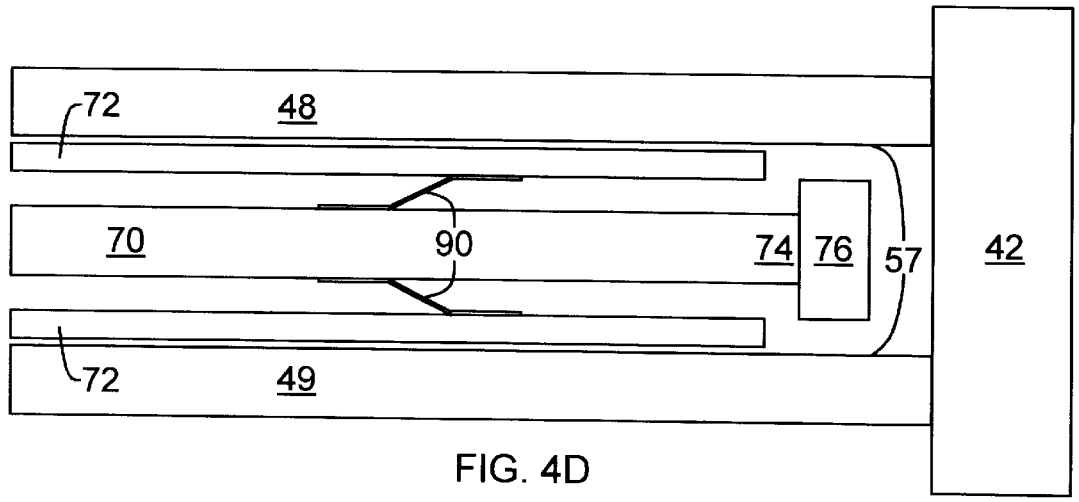
FIG. 4D is an enlarged side view of one end of another head array support arm and head assembly from the disk drive used with the apparatus of FIGS. 4A and 4B.

A cross-sectional view of the disk drive apparatus of the second embodiment is shown in FIG. 4B, and includes two disks (more or less may be employed in further embodiments), three head array support arms, and four head assemblies, one for each disk surface. As in the first preferred embodiment discussed above with respect to FIGS. 3A and 3B, the disk assembly (disks 48 and 49 and spindle 42) is preferably levitated by magnetic bearings (not shown in FIGS. 4A and 4B) and includes a touch down bearing 54, motor 50 and an evacuated chamber 41 for high RPM spinning of the disks. FIG. 4C is an enlarged side view showing the flexing cross brace 76, the associated end 74 of a head array support arm 70 and a head array 72. FIG. 4D shows a cross brace 76 and support arm 70 disposed between the two disks 48 and 49, for supporting two head arrays 72 through flexures 90. As shown in FIG. 4C, at least one flexure 90 (and preferably a plurality of flexures) connects the head array 72 to the support arm 70.

The flexures 90 urge the head array 72 toward the adjacent disk surface. During operating speeds, the sheet lift effect counteracts the force of the flexures and supports the head array 72 in a closely spaced relation to the disk surface. To inhibit the head array from contacting the disk surface at low disk speeds (when the sheet lift force is insufficient to overcome the flexure force), preferred embodiments include suitable means for moving the head array away from the disk surface at low disk speeds. Such means may include, but are not limited to, magnetic, electromagnetic, electrostatic, pneumatic, piezoelectric or mechanical devices. One preferred means for moving the head array is shown with respect to the support arm 70 located between the two disks 48 and 49 in FIGS. 4D–4F. However, the principles of the illustrated embodiment may be readily applied to the support arm 70 located above disk 48 or below disk 49 (with respect to the direction of orientation shown in FIG. 4B).

Figure 4E:
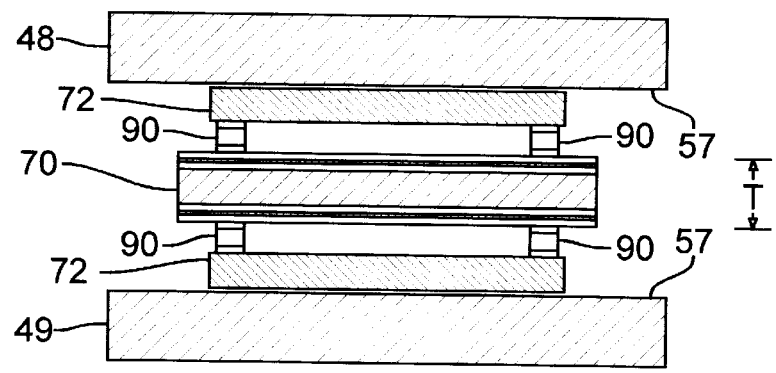
FIG. 4E is a cross sectional view of a prefered embodiment of the head assembly and support arm of FIG. 4D.
Figure 4F:
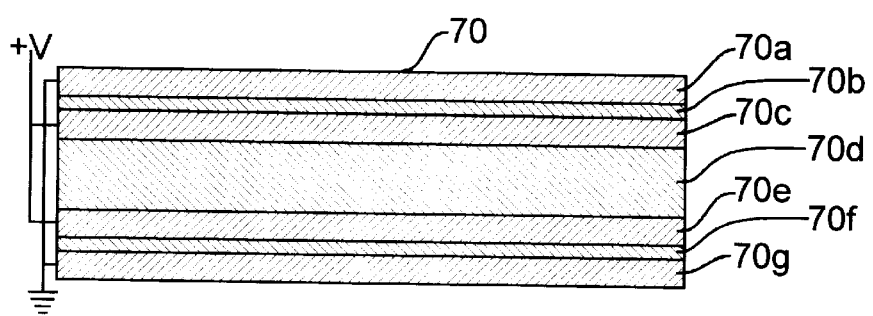
FIG. 4F is a generalized electrical schematic diagram including the head array cross-section of FIG. 4E.

In the embodiment shown in FIGS. 4E and 4F, the head array support arm 70 is composed of a structure which is electrically controlled to selectively expand or contract in thickness T to selectively draw the head arrays 72 toward or away from the adjacent disk surfaces 57. The illustrated support arm structure is composed of multiple layers of materials which form two effective capacitor structures coupled together by an elastic core. Each effective capacitor structure includes two layers of conductive material, such as aluminum, copper, or the like, that are maintained at a constant separation by a rigid dielectric insulator layer.

For example, with reference to FIG. 4F, a first effective capacitor structure is composed of two conductive layers 70a and 70c, separated by a rigid dielectric layer 70b. A second effective capacitor structure is composed of two conductive layers 70e and 70g, separated by a rigid dielectric layer 70f. The first and second effective capacitor structures are coupled together and separated from each other by an electrically insulating core 70d, composed of an elastic, stretchable material. The conductive layers 70c and 70e are electrically connected to a positive electrical potential terminal and the conductive layers 70a and 70g are electrically coupled to a negative or ground terminal, such that the two capacitor structures are electrically connected in inverted relation to each other.

Prior to applying electrical power to the effective capacitor structures, the support arm 70 has a minimum thickness T and the head arrays 72 are in a position drawn away from the disk surfaces by a distance greater than the maximum flexure length. When a positive electrical potential is applied to the positive potential terminal, preferably following a short delay after power-up of the disk drive device (to allow the disks to achieve operating speeds), a charge build-up occurs in the capacitor structures. As the charge builds up, electrostatic force repels the capacitor structures from each other, stretching the elastic core 70d and increasing the thickness T of the supprt arm 70. This, in turn, moves the head arrays 72 toward the respective adjacent disk surfaces 57 in preparation for a read and/or write operation.

On the other hand, prior to a shut-down operation, in which the disk rotation speed reduces below that necessary to provide sufficient sheet lift force to maintain the head arrays off of the disk surfaces 57, the head arrays are moved toward each other by reducing or eliminating the potential difference between the conductive layers of each capacitor structure. Also, if power is accidently lost during operation, the potential difference across each capacitor structure decreases and the elastic core returns to its unstretched thickness. This helps minimize the risk of the head arrays contacting the disk surfaces in the event of a system power failure.

While the illustrated embodiment includes two capacitor structures separated by a single elastic core, it will be understood that further embodiments may employ more capacitor/elastic core structures in the layered support arm configuration, for example, to increase expansion and/or to decrease the electrical potential (and, thus, electrical power) needed to effect the requisite expansion. In further embodiments, magnetic repulsion, electromechanical expansion, or even mechanical expansion techniques may be used in place of an electrostatic repulsion.

Figure 5A:
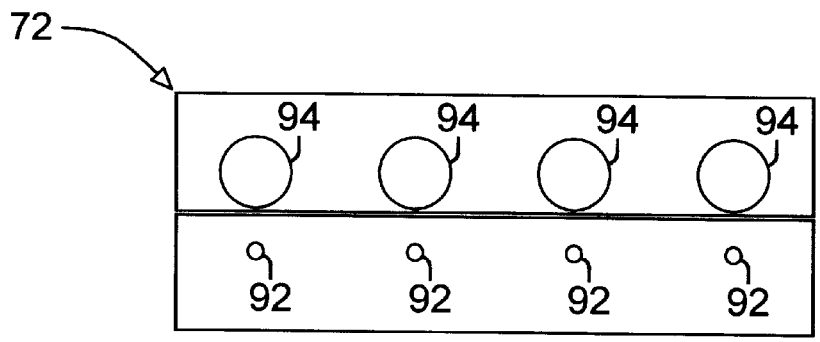
FIG. 5A is a top view of a section of a detector and VCSEL array chips used in the head assemblies of a second embodiment.

In preferred embodiments, in place of a single read and/or write head, the head array comprises a linear arrangement of plural heads, spaced apart by suitable spacings, such as from about 10 μm to about 1000 μm and, preferably, about 100 μm spacing between adjacent heads. A section of a preferred head array 72 is shown in FIG. 5A and includes a plurality of suitable laser read and/or write devices which include an emitter, for example, but not limited to Vertical Cavity Surface Emitting Lasers VCSELs 92 (such as described by Jewell et al., *Microlasers,* Scientific American, November, 1991), which are spaced at regular intervals along a semiconductor chip. Adjacent to each VCSEL 92 is an optical detector 94, for example, fabricated either on the same chip or on another chip mounted next to the VCSEL chip. Control, switching, and laser drive circuitry (not shown) may be provided on yet another chip or may be provided on the same chip as either or both the VCSELs 92 and the detectors 94.

Figure 5B:
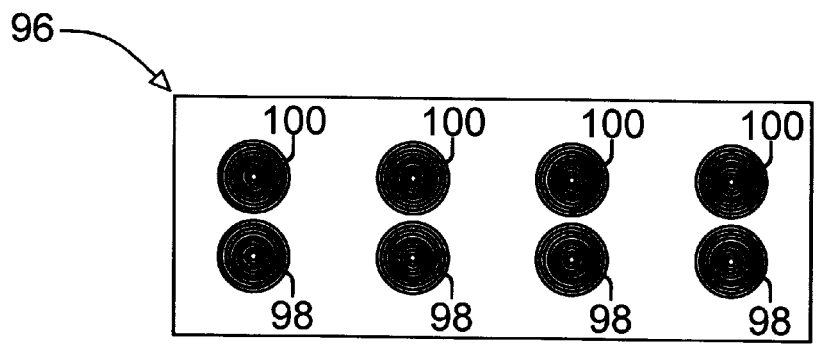
FIG. 5B is a top view of a section of a microlens array used in the head assembly of the second embodiment.

Preferred embodiments of the head assembly include an array of lenses associated with the array of VCSELs. FIG. 5B shows a section of a microlens array 96 containing a focusing lens 98 for each VCSEL and a collecting lens 100 for each detector. In preferred embodiments, the lenses 98 and 100 are fabricated using binary diffraction optic techniques (such as described by Veldkamp and McHugh, *Binary Optics,* Scientific American, May, 1992), which can provide very thin, small, mass-producible lens arrays.

Figure 5C:
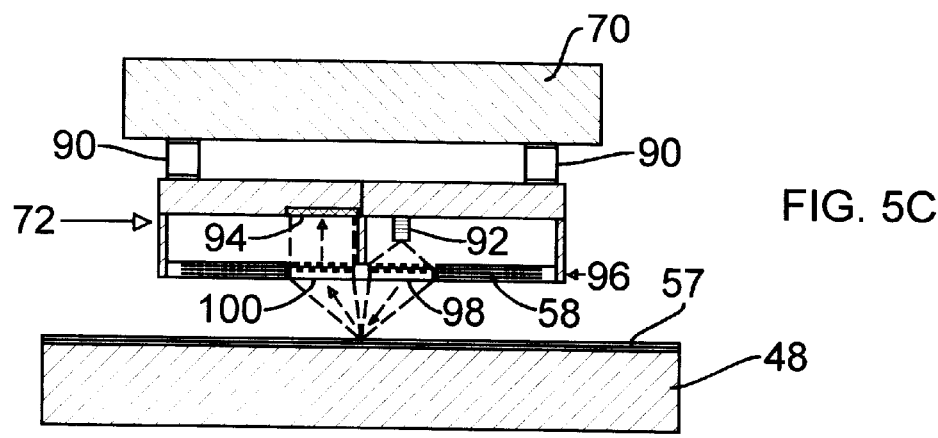
FIG. 5C is an enlarged cross-sectional view of a head assembly used in the second embodiment.

FIG. 5C shows a cross sectional view of a head assembly, composed of the emitter/detector array (or head array 72), lens array 96, and maglev coils 58 combined in the lens array. The head assembly is attached by flexures 90 to the head array support arm 70. Using spring action, the flexures 90 press the head assembly toward the disk surface 57 in opposition to magnetic levitation force. Maglev coils 58 are spaced at frequent enough intervals within the head assembly, and the head assembly itself is flexible enough to ensure that head/disk flying height is maintained within sufficiently narrow parameters to provide precise optical focus. As depicted in FIG. 5C, a laser beam emitted by a VCSEL 92 is focused at an off-angle by a binary microlens 98 to illuminate appropriate data points on the disk surface 57. Reflected or emitted light is collected by an adjacent binary collecting lens 100 and focused onto a detector 94.

Disk surface data tracks are accessed by electronically activating the closest VCSEL/lens/detector element in the head array and by directing the piezoelectric actuator 84 to move the head array support arm until that element is directly over the track. The head array assembly is, in effect, a magnetic slider that spans substantially an entire radius of the recording surface. With appropriate modifications (as described below) this technique is applicable to a variety of both optical and magnetic disk drives. Each data track is about one micron wide, more in some implementations, less in others, and each read/write head element services all data tracks within its specific, narrow band of disk surface. Thus, for example, for a 90 mm (3.5") disk and a linear head array with 64 elements, the maximum required head movement is about 500 microns. Using commercially available piezoelectric actuators and appropriate mechanical amplification this range of movement, which corresponds to the worse case seek time for the disk drive, can be accomplished in under 100 microseconds. Implementations with more head array elements and/or a smaller disk diameter can reduce the maximum movement distance and time proportionately. Positioning heads over closer data tracks also requires proportionately less time.

In preferred embodiments, a dedicated data clocking track may be included on the disk surface to help maximize linear recording density. The system may also be designed to allow multiple tracks to be read or written simultaneously (using multiple heads in the head array simultaneously), thus multiplying the data transfer rate.

Figure 6A:
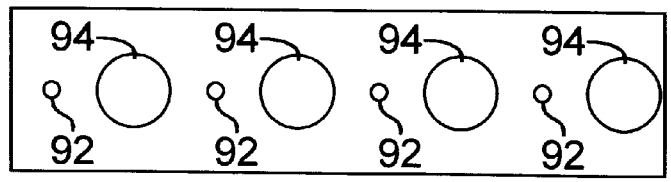
FIG. 6A is a top view of a section of a VCSEL/detector array chip used in the head assembly of a third embodiment of the present invention.
Figure 6B:
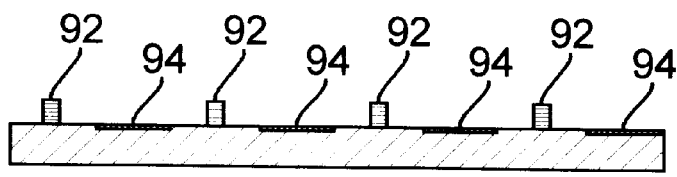
FIG. 6B is a side cross-sectional view of the VCSEL/detector array chip of FIG. 6A.
Figure 6C:
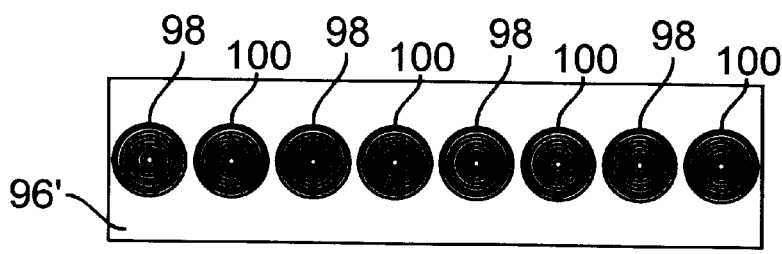
FIG. 6C is a top view of a section of a microlens array used in the head assembly of the third embodiment.
Figure 6D:
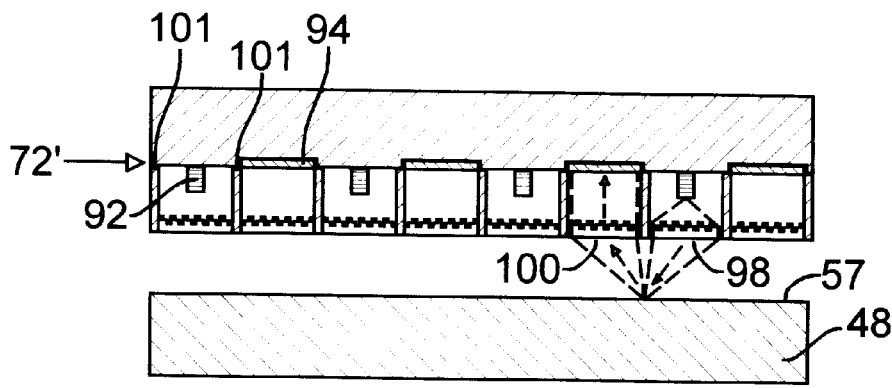
FIG. 6D is a side cross-sectional view of a segment of a head assembly used in the third embodiment.

FIG. 6A shows a segment of an integrated emitter/detector chip of a head array 72' according to a third preferred embodiment of the present invention. FIG. 6B shows a side cross-sectional view of the same section of the chip shown in FIG. 6A, and FIG. 6C shows a section of the corresponding microlens array 96'. As shown in FIG. 6D, barriers 101 are preferably provided between the adjacent emitters and detectors, to inhibit direct communication (not reflected from the disk) between adjacent components. Maglev coils (not shown) are provided at suitable intervals along the length of the head assembly for interaction with the disk surface to achieve an appropriate sheet lift effect for providing the appropriate head-to-disk spacing, as described above. Like elements (such as emitters 92, detectors 94 and lenses 98 and 100) corresponding to elements shown and described with reference to FIGS. 5A–5C are provided with corresponding reference numbers in FIGS. 6A–6C. Combining emitters and detectors on one chip, as shown in FIGS. 6A and 6B, can simplify the head assembly and has the potential to reduce costs. FIG. 6D shows a section of the integrated head assembly in operation near the surface 57 of a disk 48. The rest of the disk drive (not shown) preferably includes structure similar to that shown in FIGS. 4A, 4B, and 4C.

Figure 7A:
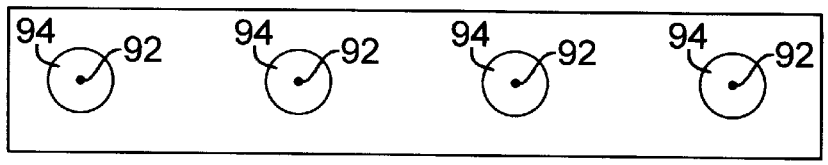
FIG. 7A is a top view of a section of a VCSEL/detector array chip of a fourth embodiment of the present invention.
Figure 7B:
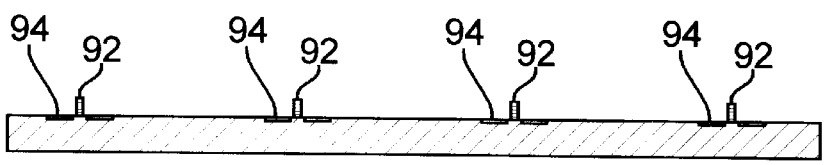
FIG. 7B is a side cross-sectional view of a segment of the chip shown in FIG. 7A.

FIG. 7A shows a segment of a head array 72" (composed of an integrated emitter/detector chip) according to a fourth preferred embodiment of the present invention. Here, each detector 94 is configured with an emitter 92 (preferably a VCSEL) at its center, further compacting the overall head array design. FIG. 7B shows a side cross-sectional view of the same section of the head array 72" shown in FIG. 7A, and FIG. 7C shows a section of the corresponding microlens array 96".

Figure 7C:
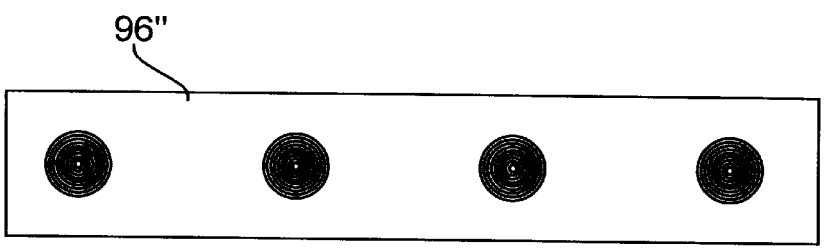
FIG. 7C is a top view of a section of a microlens array used in the fourth embodiment.
Figure 7D:
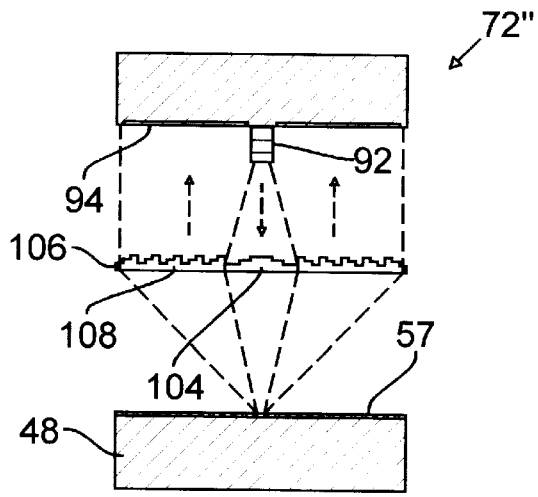
FIG. 7D is a side cross-sectional view of one VCSEL/microlens/detector element of the fourth embodiment.
Figure 7E:
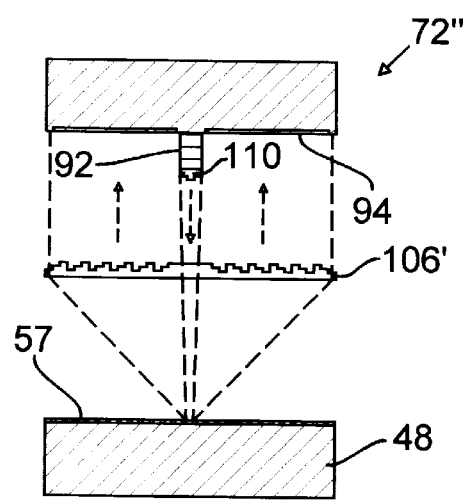
FIG. 7E is a side cross-sectional view of an alternative VCSEL/microlens/detector element design for the fourth embodiment.

FIG. 7D shows one preferred implementation of the head assembly of FIGS. 7A–7C in operation. The central area 104 of each microlens 106 is designed to focus the laser beam onto a disk surface data track. The surrounding area 108 of each microlens 106 collects the return emission and focuses it onto the detector 94. FIG. 7E shows an alternative implementation in which each emitter 92 (e.g., VCSEL) is fabricated with an integral focusing lens 110, allowing the collection lens 106' to be larger and thus collect more light energy for a stronger signal. Shrouds or baffles may be disposed around the emitters 92 in the embodiments of FIGS. 7D and 7E, to inhibit direct communication between the emmitter and surrounding detector. Maglev coils or permanent magnets (not shown) are provided at suitable intervals along the length of the head assembly for interaction with the disk surface, to achieve an appropriate sheet lift effect for providing the appropriate head-to-disk spacing, as described above. Also, with respect to the embodiment of FIG. 7E, the central portion of the microlens 106' (the portion through which the emitter beam passes before impinging on the disk surface) may have an opening through which the beam passes. By passing the beam, unobstructed, through a central opening (not shown) in the microlens 106', unwanted reflection of the beam from the lens surface to the detector may be minimized or eliminated. The rest of the disk drive (not shown) includes structure similar to that shown in the FIGS. 4A, 4B, and 4C embodiment.

Figure 8A:
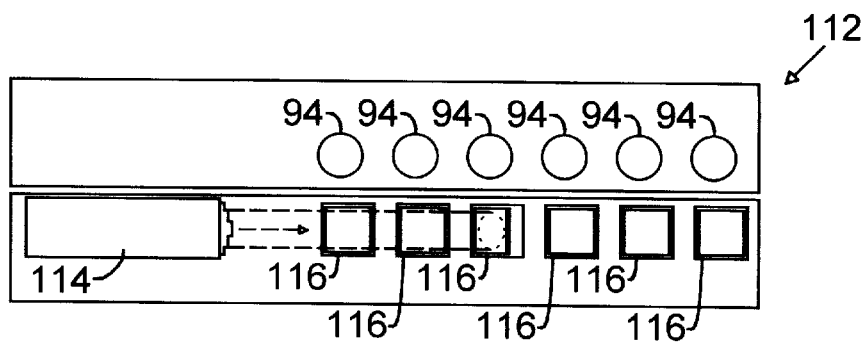
FIG. 8A is a top view of a segment of micromirror and detector array chips used in the head assembly of a fifth embodiment of the present invention.

FIG. 8A shows one end segment of a head array 112 used in a disk drive apparatus according to a fifth preferred embodiment of the present invention. In this design micromirrors are used in place of VCSELs. Micromirror devices, also called "digital micromirror devices" or "DMDs" are known in the art as described, for example, in U.S. Pat. No. 5,448,546 to Pauli (incorporated herein by reference).

Figure 8B:
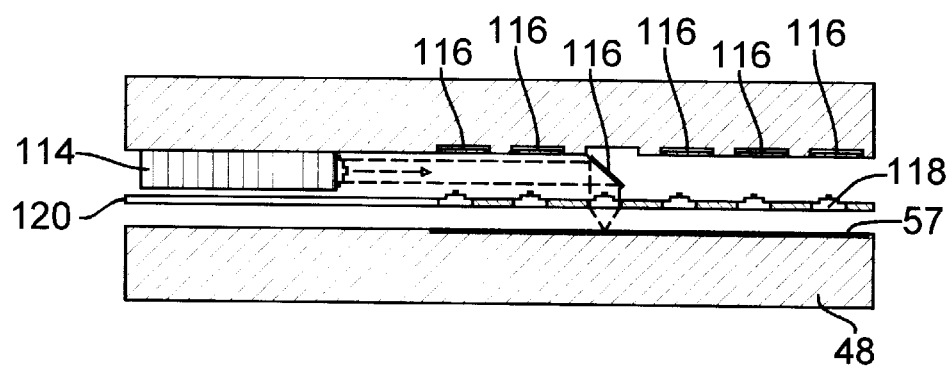
FIG. 8B is a side cross-sectional view of a segment of a head assembly used in the fifth embodiment.

A single laser 114 directs a beam over the surface of a planar array of micromirrors 116, as shown in a side cross-sectional view of the same array segment in FIG. 8B. An integral microactuator (not shown) is provided with each of the micromirrors. When one of the microactuators is activated, the associated micromirror flexes away from the chip surface, reflecting the laser beam through a microlens element 118 of the lens array 120, as shown in FIGS. 8B and 8C, to focus the beam onto the disk surface 57.

Figure 8C:
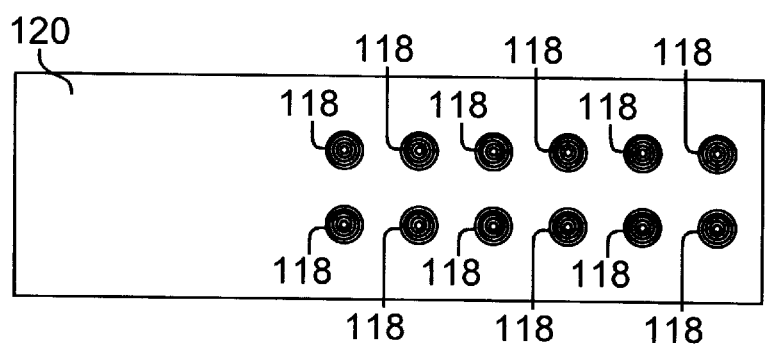
FIG. 8C is a top view of a segment of a microlens array used in the fifth embodiment.
Figure 8D:
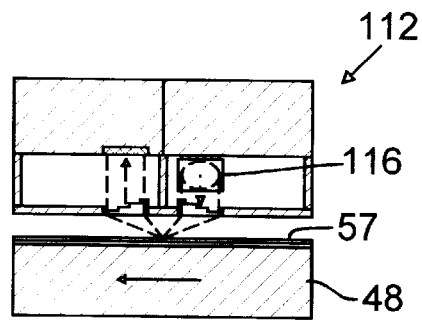
FIG. 8D is a cross-sectional view of the head assembly used in the fifth embodiment.

FIG. 8D shows a cross-sectional view of the combined head assembly of FIGS. 8A–8C in operation. As with VCSEL designs, micromirrors and detectors may be alternated in linear fashion, rather than side-by-side. Alternatively, the detector array may be replaced by a beam splitter and a single detector, as used in conventional optical designs. Also, in further embodiments, the laser 146 may be positioned off of the micromirror array and the laser beam may be directed along the micromirror array with suitable reflective and/or refractive optic devices. Maglev coils (not shown) are preferably provided at suitable intervals along the length of the head assembly (preferably along the length of the microlens assembly) for interaction with the disk surface to achieve an appropriate sheet lift effect for providing the appropriate head-to-disk spacing, as described above. The rest of the disk drive (not shown) includes structure similar to that shown in FIGS. 4A, 4B, and 4C.

Figure 9A:
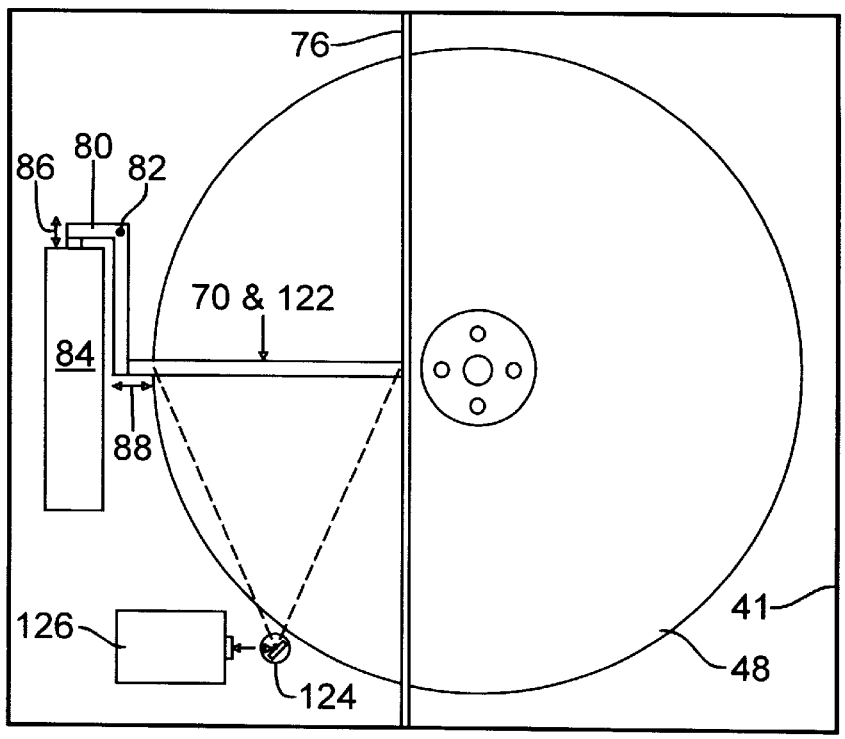
FIG. 9A is a top view of a disk drive apparatus according to a sixth embodiment of the present invention.

FIG. 9A shows the disk drive apparatus according to a sixth embodiment of the present invention. While many features of this embodiment are identical to the previous four embodiments, here the read/write laser is removed from the head assembly entirely. Instead, a routing prism 122 occupies the full length of the head array support arm 70. A mirror galvanometer or similar spatial light modulator 124 is positioned next to the disk 48 for controlling the scanning of a collimated read and/or write laser beam 125 (from a standard laser/optical transceiver 126) to designated points on the routing prism 122. The prism 122 reflects the beam downward through apertures 128 in the support arm 70, to a microlens focusing array 130, suspended by flexures 90 below the support arm.

Figure 9B:
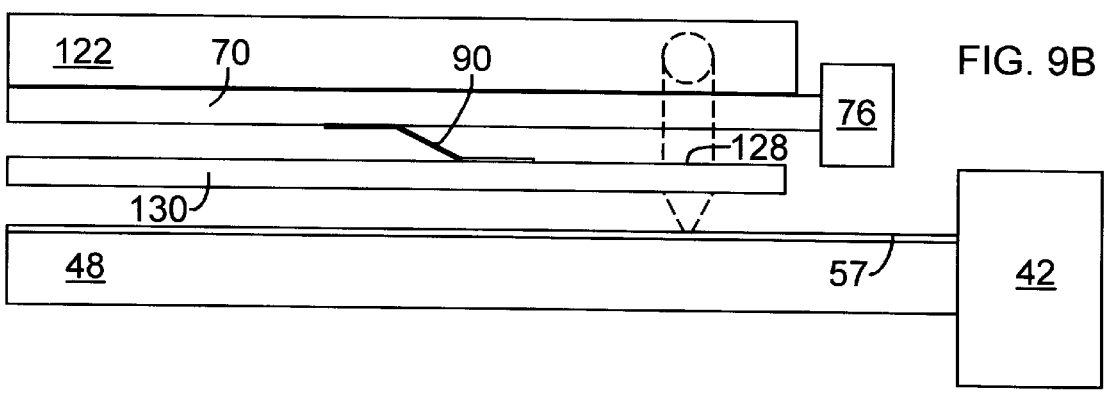
FIG. 9B is a side view of one end of a head assembly/support arm used in the sixth embodiment.
Figure 9C:
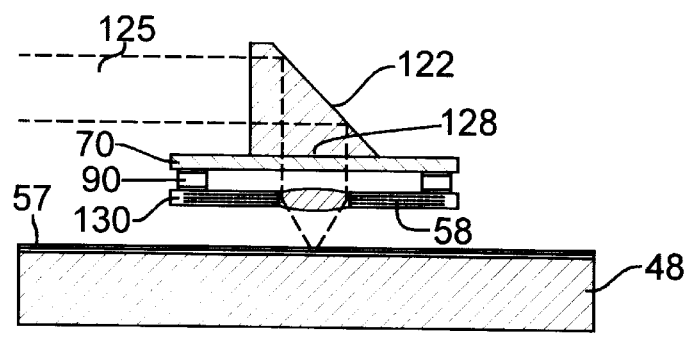
FIG. 9C is a cross-sectional view of a head assembly/support arm used in the sixth embodiment.

An enlarged side view of one end of the support arm 70, routing prism 122 and microlens array 130 is shown in FIG. 9B. FIG. 9C is a cross-sectional view of the support arm/head assembly showing how the read and/or write beam 125 is reflected by the prism 122, focused onto the disk 48, and returned to the prism 122. From the prism 122, the returned beam is directed back to the laser/optical transceiver for processing. In further embodiments, a mirror (not shown) may be used in place of the prism 122.

Figure 10A:
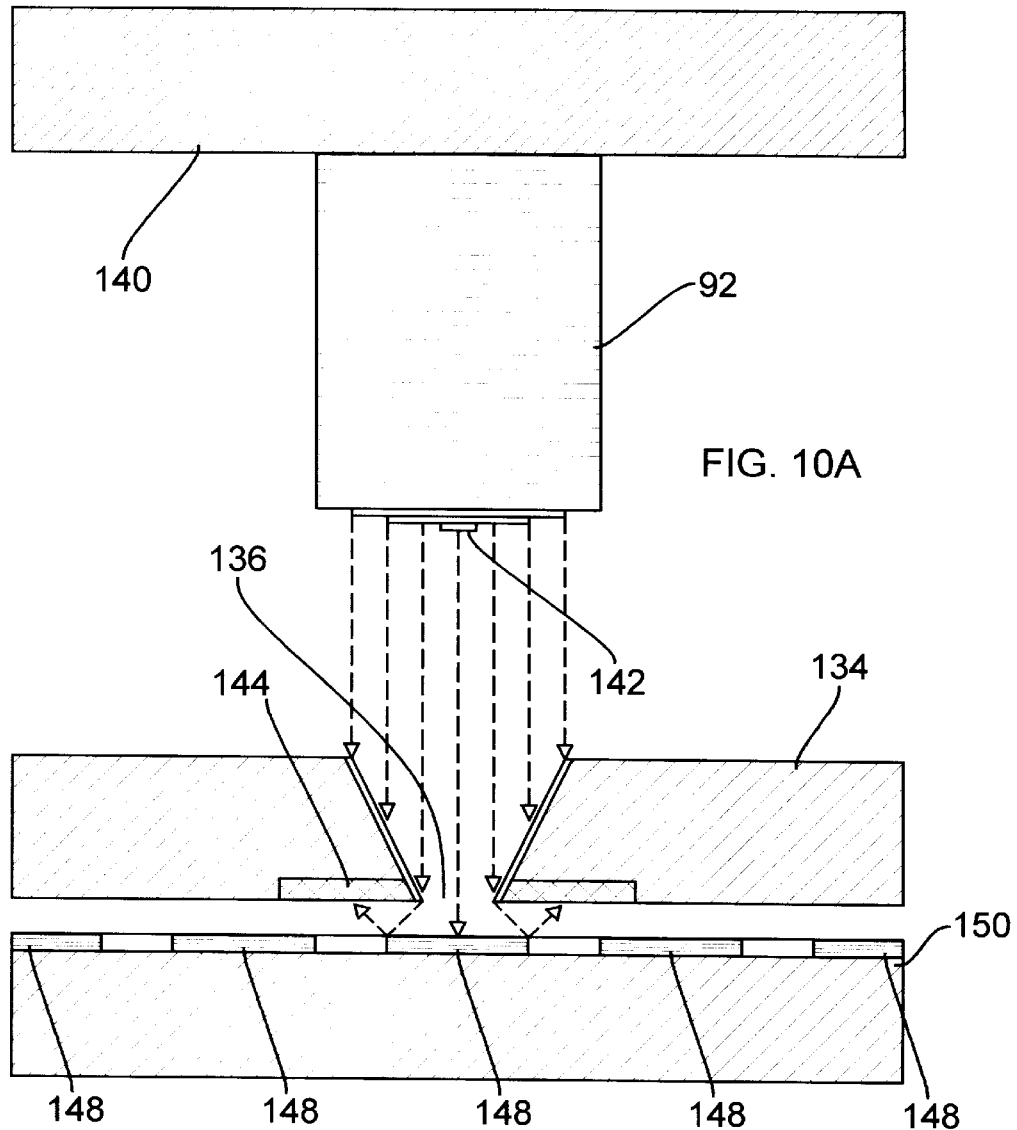
FIG. 10A is a side cross-sectional view of a single VCSEL/lens/detector element and the associated optical disk used in a seventh embodiment.
Figure 10B:
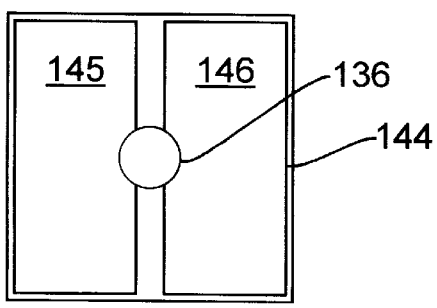
FIG. 10B is a bottom view of a single near-field lens aperture and segmented detector of the type used in the seventh embodiment.
Figure 10C:
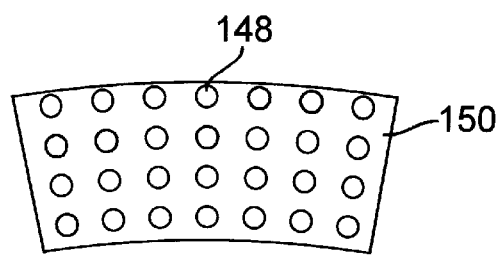
FIG. 10C is an enlarged view of a section of the disk surface used in the seventh embodiment.

FIGS. 10A, 10B, and 10C depict various features included in a seventh embodiment of the present invention which uses "near field optics" for increased data density. The resolution limit of conventional optics is approximately one half of the wavelength of the light being used in the system. For example, if an optical data recording system employs a near-infrared laser of 1000 nanometer wavelength, conventional optics will focus the beam to a spot about 500 nanometers across, at best. Until recently this appeared to set an insurmountable limit on optical data recording density, and development of shorter wavelength lasers was seen as the only way to raise the limit.

However, according to the seventh embodiment, near-field optics phenomenon (Betzig and Trautman, *Near-Field Optics. Microscopy, Spectroscopy, and Surface Modification Beyond the Diffraction Limit,* Science, Vol. 257, pp. 189, Jul. 10, 1992) may be employed to increase data density. By placing a surface close enough to a near-field aperture, i.e. a separation equal to less than one wavelength of the light being used and an aperture diameter of less than one wavelength, the surface area illuminated depends only on the size of the aperture and the separation between the aperture and the surface. Using visible light, resolutions down to approximately 10 nanometers have been demonstrated.

Near-field operation requires separation between surface and aperture to be controlled to an accuracy of a few nanometers. An air-bearing slider similar to those used in conventional magnetic hard drives is one means to achieve this control (see U.S. Pat. No. 5,199,090 to Bell), but retains all of the problems associated with air-bearing sliders described in the background section herein. Accordingly, in preferred embodiments, a maglev slider as described herein, provides an alternative means, without such problems.

FIG. 10A shows one element of a linear head array utilizing near-field optics, according to the seventh embodiment of the present invention. A near-field lens array 134 replaces the microlens array used in the head assemblies of previous embodiments, such as the one shown in FIG. 7E. The near-field lens array includes a plurality of apertures (one of which is shown at 136), corresponding in number and position to the plurality of emitters in the head array 140. When activated, one emitter (e.g., VCSEL) 92 from a linear array of emitters in the head array 140 emits a beam through an integral collimating lens 142, illuminating the corresponding near-field lens aperture 136 in the lens array 134. Light passes through the aperture 136, reflects from the disk surface, and is collected by a detector 144, preferably disposed on the underside (the disk-facing side) of the same chip containing the near-field lens array 134. The head assembly is maintained at near-field flying height by maglev coils or magnets (not shown) disposed at suitable intervals along the head assembly (preferably along the near field lens array 134), such as previously described with respect to the above-discussed embodiments.

While the illustrated embodiment includes detectors 144 located on the disk-facing side of the lens array 134, further embodiments may include detectors located above the lens array 134, e.g., within the head array 140 or between the head array 140 and the lens array 134. However, for purposes of maximizing the detectable signal, it is preferred that the detectors 144 be located on the disk-facing side of the lens array 134, as illustrated. When a light signal passes through a near-field aperture much of the signal is lost. Thus detectors on the lens array underside will collect significantly more light than would conventional beam splitters and detectors placed above the aperture.

In preferred embodiments, as shown in FIG. 10B, each detector 144 is divided into two segments 145 and 146, for purposes of monitoring and controlling track alignment. If one segment receives a stronger signal than the other, the signal difference indicates a misalignment of the aperture 136 with a data island 148 on the disk 150, which may be immediately corrected by the piezoelectric head array actuator and actuator control electronics (not shown in FIGS. 10A–10C).

As shown in FIG. 10C, data islands 148 of an optical recording disk are surrounded by aluminum or copper, to keep the reactive surface as close as possible to the maglev coils for precise interaction. Separation between data islands also provides a buffer zone to ensure that data is written to or read from only the intended locations, thereby minimizing crosstalk. Near-field apertures in the lens array may be fabricated by any conventional means such as etching. After etching, the lens array may be coated with an opaque material such as aluminum, to prevent light from entering the detector through the lens material itself. The remainder of the disk drive apparatus may be similar to that of the system depicted in FIGS. 4A, 4B, and 4C.

Figure 11A:
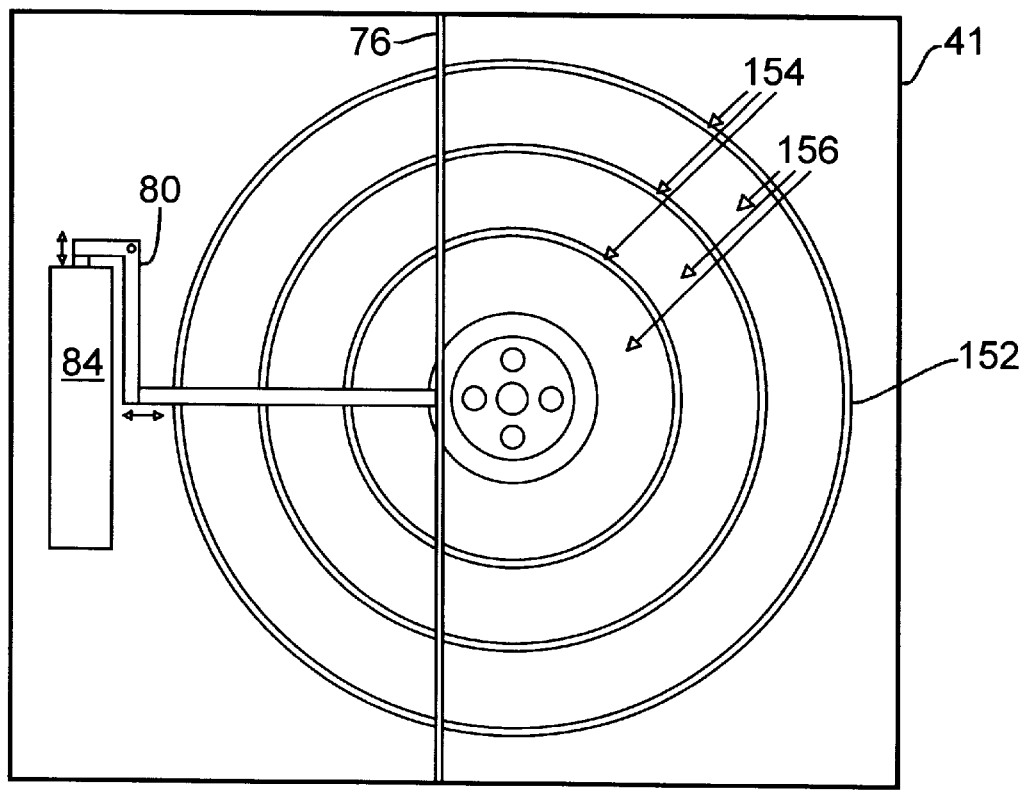
FIG. 11A is a top view of a disk drive apparatus according to an eighth embodiment of the present invention.
Figure 11B:
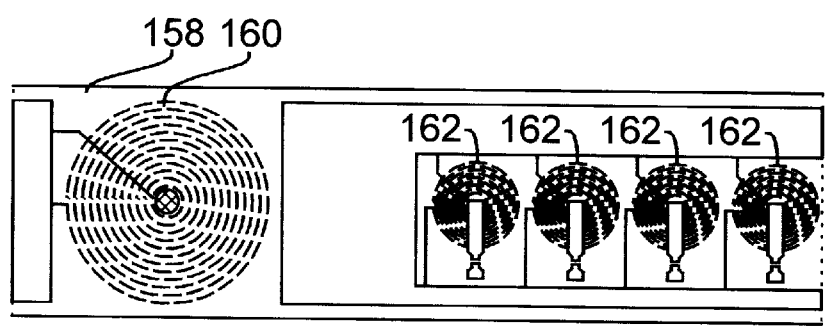
FIG. 11B is an enlarged view of a segment of the magnetic head array chip used in the eighth embodiment.

FIGS. 11A and 11B show features of a disk drive apparatus according to an eighth preferred embodiment of the present invention. The overall disk drive design is substantially similar to the system depicted in FIGS. 4A, 4B, and 4C, except that this embodiment includes means associated with magnetic recording rather than optical recording. As shown in FIG. 11A, the disk 152 is a magnetic recording disk provided with a plurality of narrow bands 154 on the disk surface for interaction with levitation magnets, both to support the disk assembly and to levitate the read/write heads, as previously described. These bands 154 are fabricated of aluminum, copper, or an equivalent conductive, nonmagnetic material, as described previously, preferably deposited on a high strength core. The remainder of the disk surface is coated with magnetic recording material of conventional composition, to define annular data recording zones 156. Since each of the levitation bands 154 need only be approximately one millimeter wide, the vast majority of the disk surface remains available for data recording.

A segment of the read and/or write head array 158 according to the eighth embodiment of the present invention is shown in FIG. 11B. Preferably, the head array 158 is constructed as a single integrated circuit or a single chip formed with thin film technology. Maglev coils or magnets 160 are periodically interspersed with rows of individually activated magnetic heads 162. Switching and interface circuitry such as drivers and amplifiers (not shown) occupies the remainder of the integrated circuit chip, or may be placed on one or more companion chips. The head array chip 158 is attached via flexures to the head array support arm, in a manner similar to that shown in FIG. 4C.

High magnetic recording density requires read/write heads to be in close proximity to the recording surface, typically 100 nanometers or less. For this reason the back of the head array chip may be thinned or grooved to increase flexibility. Spring-force flexures and levitation magnets are placed at close enough intervals to ensure that the head array chip conforms to any variations in the disk surface, thus maintaining minimum separation between the disk surface and the head array chip.

Since the piezoelectric head position actuator is capable of far higher speed than conventional actuators, data tracks here may be narrower than in disks used with other magnetic disk drives, without exceeding the ability of the system to react in time to maintain alignment. In further preferred embodiments, dedicated alignment tracks and position tracking mechanisms are included to assist in track alignment.

In preferred embodiments, the multiple head arrays described herein are employed with a maglev disk supporting system and a maglev slider. In further embodiments, a head assembly configuration having an array of plural heads coupled to an actuator, such as a piezoelectric actuator, for very fast, short-stroke movements is employed with conventional air-bearing sliders (such as shown with respect to FIG. 1C) and/or conventional disk supporting structures (such as shown with respect to FIGS. 1A and 1B). The multiple head array and actuator arrangement is capable of providing improved seek time with respect to typical conventional single head devices. Also, in yet further embodiments, a disk drive system includes a conventional disk supporting structure (such as shown with respect to FIG. 1A), but also includes a maglev slider and head (or head array) system.

Embodiments of the invention described herein may be configured as disk drive systems with one or more disks permanently installed within an air-evacuatable housing. In further embodiments, the apparatus may be configured with removable disks and a resealable, air-evacuatable housing. In yet further embodiments, the disks, head assemblies and support arm structures may be disposed within a removable air-evacuatable cartridge, which is removable from a larger housing structure containing other components of the system.

Various embodiments described herein employ a head array composed of multiple heads disposed on one side of the rotation axis of the disk (on the left side in the illustrated embodiments). Further embodiments may include a second head array, support arm, cross brace, and actuator assembly located on the opposite side of the disk (for example, on the right side of the disks in the illustrated embodiments), for reducing data accessing delays caused by disk rotation delays. In yet further embodiments, more than two head arrays, support arms, cross braces and actuator assemblies may be located at spaced intervals around the disk for yet further reductions in data accessing delays. In any of the above-discussed embodiments, the cross brace may be replaced with a stationary structure (such as an annular ring-like member) disposed adjacent the central portion of the disk and connected to each head array support arm by a flexure or suitable elastic member. Also, in embodiments employing heads capable of reading and writing, using electron trapping optical memory technology, preferably the read laser beam is of a different frequency than the write laser beam.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk drive apparatus for performing reading or writing operations with at least one data storage disk of the type having a disk surface through which data may be communicated, the apparatus comprising:

a housing having an interior for receiving said at least one data storage disk;

means for rotating said at least one data storage disk at a first disk rotation speed, upon said disk being received in the housing interior;

at least one head assembly disposed within the housing for communication with a corresponding one of said at least one data storage disk, each head assembly having a plurality of heads positioned adjacent the disk surface of the corresponding disk for communication of data with said disk upon receipt of said disk within the housing;

an actuator coupled to said at least one head assembly, for selectively providing fast, short movements of each of said head assemblies relative said disk surface of the data storage disk corresponding to the head assembly, upon receipt of said at least one data storage disk within the housing; and a support brace coupled to the at least one head assembly at a location spaced from the actuator during reading or writing operations.

2. A disk drive apparatus as recited in claim 1, wherein said at least one head assembly comprises at least one chip having a linear array of heads formed thereon.

3. A disk drive apparatus as recited in claim 1, wherein said actuator comprises a piezoelectric device.

4. A disk drive apparatus as recited in claim 1, wherein each of said at least one data storage disk is composed, at least in part, of an electrically conductive, nonmagnetic material, and wherein said head assembly comprises at least one magnet means for providing a magnetic force of suitable strength to interact with the electrically conductive material of said adjacent disk upon rotation at said first disk rotation speed to provide a sheet lift effect suitable to support said head assembly adjacent but spaced from said adjacent disk surface.

5. A disk drive apparatus as recited in claim 1, wherein said actuator comprises a piezoelectric stack device having a plurality of layers of piezoelectric material.

6. A disk drive apparatus as recited in claim 1, wherein said actuator comprises a piezoelectric bimorph structure.

7. A disk drive apparatus as recited in claim 1, wherein said actuator comprises a cantilever piezoelectric structure.

8. A disk drive apparatus as recited in claim 1, wherein said actuator comprises a piezoelectric bender beam structure.

9. A disk drive apparatus as recited in claim 1, wherein said actuator comprises an electromagnetic actuator.

10. A disk drive apparatus as recited in claim 1, wherein said at least one head assembly comprises a plurality of head assemblies disposed adjacent each respective disk surface of each data storage disk.

11. A disk drive apparatus as recited in claim 1, wherein each head assembly comprises a head support arm having a linear dimension and a plurality of heads disposed along the linear dimension of the support arm.

12. A disk drive apparatus as recited in claim 1, wherein the support brace comprises at least one flexible member coupled to the housing and extending across at least one respective data storage disk, upon said disk being received in the housing.

13. A disk drive apparatus as recited in claim 1, wherein each head assembly comprises a generally rigid body having an elongated dimension and opposite ends in the elongated dimension and wherein the support brace is coupled to one of said ends.

14. A disk drive apparatus as recited in claim 1, wherein:

each head assembly comprises a generally rigid body having an elongated dimension and opposite ends in the elongated dimension;

the actuator is coupled at one of said ends of said generally rigid body; and the support brace is coupled at the other of said ends of said generally rigid body.

15. A disk drive apparatus as recited in claim 14, wherein the support brace comprises a flexible band extending across the data storage disk associated with the head assembly to which the support brace is coupled.

16. A disk drive apparatus as recited in claim 1, wherein:

said at least one storage disk comprises a plurality of storage disks;

said at least one head assembly comprises a plurality of head assemblies;

said support brace comprises a plurality of flexable bands, each band extending across a respective one of said data storage disks, upon said disks being received in the housing.

17. A data storage and retrieval system comprising:

at least one data storage disk defining at least one disk surface;

a housing having an interior for receiving said at least one data storage disk;

means for rotating said at least one data storage disk at a first disk rotation speed, upon said disk being received in the housing interior;

at least one head assembly for data communication with at least one of said data storage disk surfaces, each head assembly being disposed within said housing adjacent a corresponding disk surface upon said at least one disk being received in the housing interior, each head assembly having a plurality of heads positioned adjacent its corresponding disk surface; and an actuator coupled to said at least one head assembly, for selectively providing fast, short movements of each of said head assemblies relative said disk surface of the data storage disk corresponding to the head assembly, upon receipt of said at least one data storage disk within the housing; and a support brace coupled to the at least one head assembly at a location spaced from the actuator during data communication with at least one of said data storage disk surfaces.

18. A data storage and retrieval system as recited in claim 17, wherein each data storage disk comprises a disk substrate having a magnetizable material thereon.

19. A data storage and retrieval system as recited in claim 17, wherein each data storage disk is composed, at least in part, of an electrically conductive, nonmagnetic material and wherein said head assembly further comprises at least one magnet means for providing a magnetic force of suitable strength to interact with the electrically conductive, nonmagnetic material of said adjacent disk upon rotation at said first disk rotation speed to provide a sheet lift effect suitable to support said head assembly adjacent but spaced from said adjacent disk surface.

20. A data storage and retrieval system as recited in claim 17, wherein each head assembly comprises a head support arm having a linear dimension extending at least partially across a respective disk surface and a plurality of heads disposed along the linear dimension of the support arm.

21. A data storage and retrieval system as recited in claim 17, wherein the support brace comprises a flexible band extending across the data storage disk associated with the head assembly to which the support brace is coupled.

22. A process of driving a data recording disk, the process comprising the steps of:

supporting at least one data storage disk having a pair of opposed disk surfaces, in a housing interior;

providing a support brace having a generally flexible member extending across at least one of said opposed disk surfaces in the housing interior;

supporting at least one head assembly with said support brace during data communication with at least one of said data storage disks, each head assembly having a plurality of heads adjacent a corresponding disk surface;

rotating said at least one data storage disk at a first disk rotation speed in the housing interior; and moving said at least one head assembly adjacent a respective disk surface with an actuator.

23. A process as recited in claim 22, wherein each disk is of the type composed, at least in part, of an electrically conductive, nonmagnetic material, said process further comprising the steps of:

providing at least one magnet means disposed in the housing interior adjacent each disk received in the housing interior;

providing a magnetic force with said at least one magnet means, wherein said magnetic force is of suitable strength to interact with the electrically conductive material of each adjacent disk upon rotation at said first disk rotation speed to provide a sheet lift effect suitable to suspend each disk during said rotation with no physical contact between the disk and the housing interior or any structure fixed with respect to the housing interior.

24. A process as recited in claim 22, wherein said step of moving said at least one head assembly comprises activating a piezoelectric actuator coupled to the head assembly.

25. A process as recited in claim 22, wherein said step of supporting at least one head assembly comprises supporting a plurality of head assemblies adjacent each respective disk surface, wherein each head assembly comprises a plurality of heads.

26. A process as recited in claim 22, wherein the generally flexible member of the support brace comprises a flexible band extending across the data storage disk associated with the head assembly to which the support brace is coupled.

* * * * *